Sept. 17, 1946. C. G. HOLSCHUH ET AL 2,407,665
AIRCRAFT FIRE CONTROL COMPUTER
Filed Aug. 1, 1940 3 Sheets-Sheet 1

INVENTORS
Carl G. Holschuh
David Fram
BY
Herbert H. Thompson
THEIR ATTORNEY

Sept. 17, 1946. C. G. HOLSCHUH ET AL 2,407,665
AIRCRAFT FIRE CONTROL COMPUTER
Filed Aug. 1, 1940 3 Sheets-Sheet 2
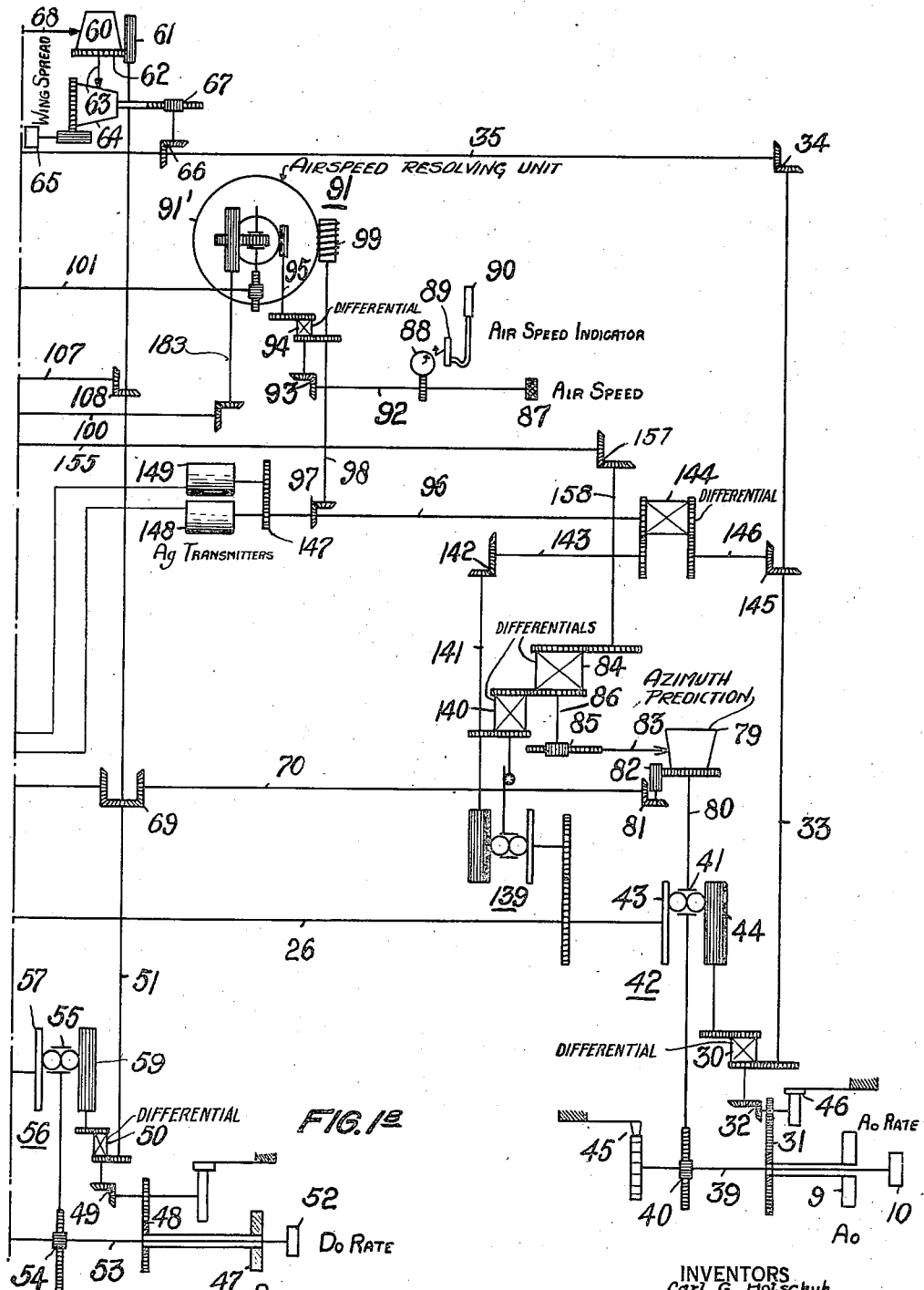
FIG. 1ᵃ
INVENTORS
Carl G. Holschuh
David Fram
BY Herbert H. Thompson
THEIR ATTORNEY.

Sept. 17, 1946. C. G. HOLSCHUH ET AL 2,407,665
AIRCRAFT FIRE CONTROL COMPUTER
Filed Aug. 1, 1940   3 Sheets-Sheet 3
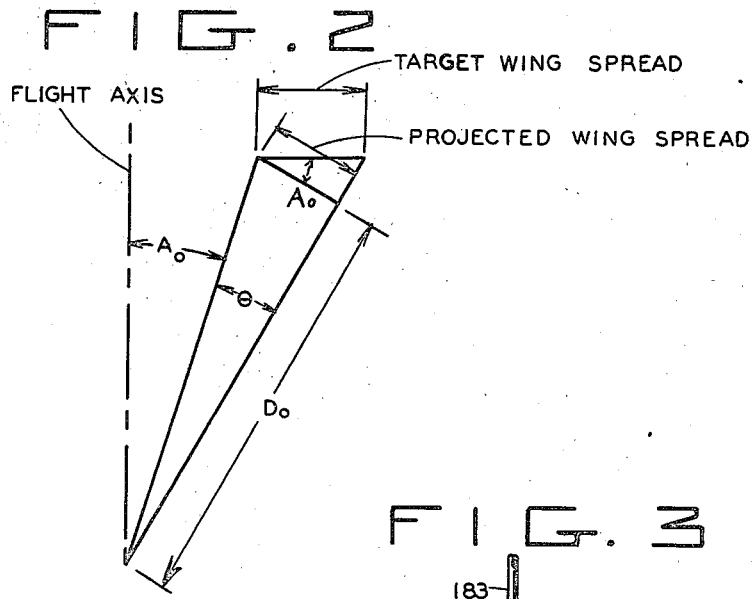
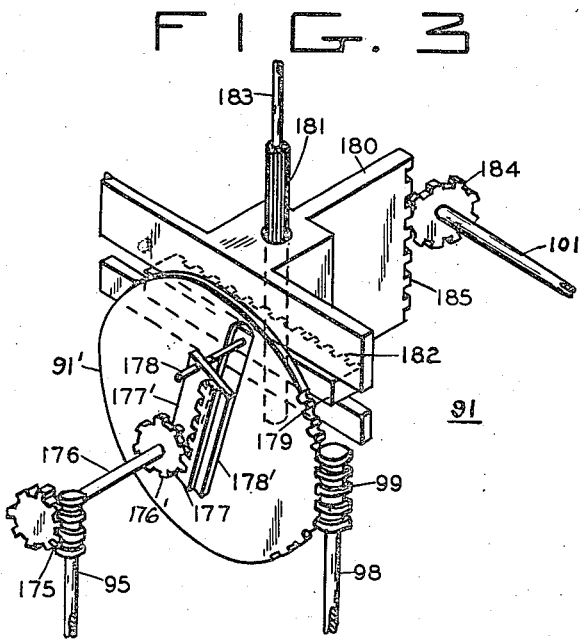
INVENTORS
CARL G. HOLSCHUH
DAVID FRAM
THEIR ATTORNEY.

Patented Sept. 17, 1946

2,407,665

UNITED STATES PATENT OFFICE 2,407,665

AIRCRAFT FIRE CONTROL COMPUTER

Carl G. Holschuh, Wood-Ridge, N. J., and David Fram, Brooklyn, N. Y., assignors to Sperry Gyroscope Company, Inc., Brooklyn, N. Y., a corporation of New York Application August 1, 1940, Serial No. 349,336

6 Claims. (Cl. 235—61.5)

This invention relates to apparatus for directing gunfire at an aerial target from an attacking aircraft and refers more particularly to a sighting and computing device adapted to direct gunfire from a high speed pursuit airplane in an attack on a slower plane, for example, a bomber.

The present invention constitutes a modification of and improvement in the apparatus disclosed in the copending application of Earl W. Chafee, Serial No. 211,550, filed June 3, 1938, and assigned to the assignee of the present inventors, which application discloses an automatic sight and computer comprising apparatus adapted for sighting and tracking an aerial target together with range finding means and a computing mechanism for obtaining from target azimuth, elevation and range data and the indicated air speed of the attacking plane the proper angle for positioning a gun relative to the line of sight. The plan of attack for which the device of the above application is adapted is one in which the firing plane having the superior mobility of the two craft, trails the target on a parallel course and at a chosen range which is maintained constant.

The present invention provides apparatus of the general character previously disclosed which is not limited in its functioning to a single constant range but which has means for obtaining and introducing into the computer variable range data and for performing the more complicated computations incident thereto.

Another object of the present invention is to provide means for setting up and automatically introducing into the computer a rate of change of range.

Still another object is to provide in apparatus of the above character simplified sighting and range finding controls whereby adjustments may be made and automatically continuing changes of adjustment set up without shifting the hand from one control member to another.

A further object is to provide apparatus of the above character which is adapted to be used as a bombsight and also for obtaining a measure of ground speed.

Other objects and advantages of this invention will become apparent as the description proceeds.

Referring to the drawings,

Fig. 1 (in two parts, Fig. 1A and Fig.1B) is a schematic diagram of an improved sight, range finder and computer according to the invention.

Fig. 2 is a diagram illustrating the method of computing range.

Fig. 3 is a perspective view of the wind resolving unit.

Figure 1A:
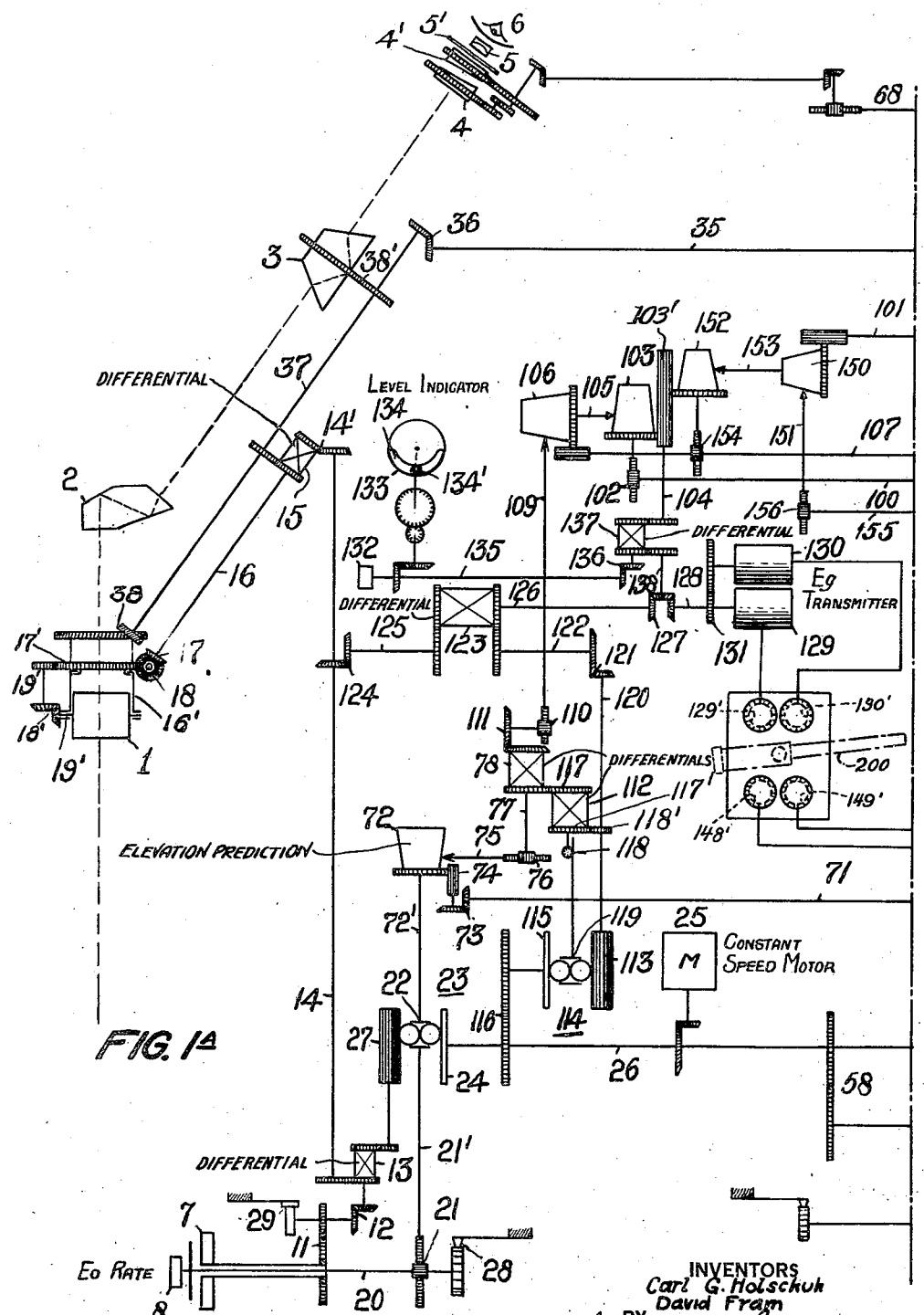

The sighting and computing apparatus is preferably housed in a single housing adapted to be fixedly mounted on an airplane with the axes of the instrument in fixed relationship to, and preferably coincident with, the axes of the plane. The optics of the sighting apparatus comprise a prism 1 rotatable in azimuth and elevation in which the line of sight experiences one total reflection, a prism 2 in which the line of sight is twice totally reflected, a dove prism 3 rotatable about an inclined axis in which a single reflection occurs, range finding optical wedges 4, 4' and eye piece 5. When a target is in the field of view and a suitable adjustment of the wedges 4, 4' has been made, an observer with his eye placed at 6 sees two separate images of the target plane, a normal and a displaced image, these images being upright and unreversed as to right-left components and adjacent wing tips of the two images apparently just touching one another so that the center to center distance is equal to the wing spread. The positioning of said two images in the just described relationship by the operation of the range setting control or controls effects a range setting, the value of the range so set being introduced into the computing mechanism.

The training of the line of sight on the target in elevation is accomplished by means of elevation ($E_o$) displacement knob 7 and elevation rate knob 8 and in azimuth by means of azimuth ($A_o$) displacement knob 9 and rate knob 10. The motion of elevation displacement knob 7 is transmitted by spur gears 11 and bevel gears 12 to one arm of mechanical differential 13, a second arm of which is connected to shaft 14 which, in turn, is connected by bevel gears 14' to one arm of mechanical differential 15. A second arm of differential 15 drives shaft 16 which in turn rotates prism 1 about horizontal shaft 19' by means of bevel gears 17, worm drive 18, spur gear 17', freely rotatable about tubular member 16', its meshing pinion 19 and bevel gears 18'.

Besides the means for tracking the target in elevation provided by elevation displacement knob 7, provision is made for automatic tracking at a constant rate by rotating prism 1 from the output of a variable speed device 23 controlled by elevation rate knob 8. The rotation of knob 8 transmitted to shaft 20, rack and pinion 21 and push rod 21' displaces ball carriage 22 of this device and the position of the balls retained in carriage 22 and driven by disc 24, rotated by constant speed motor 25 by way of shaft 26, determines the speed at which cylinder 27 rotates, this speed being proportional to the displacement of arriage 22 from the center of disc 24. The motion of cylinder 27, introduced into a third arm f differential 13 by way of gearing, results in a ontinuous rotation of shaft 14 and hence of prism about its horizontal axis at a rate proportional o the displacement of knob 8. Knobs 7 and 8 are coaxial and are arranged on their shaft and sleeve, respectively, so that they may be grasped simultaneously with one hand. This is of considerable importance since by "double gripping" an operator with practice can adjust both the displacement and rate of change of the line of sight without having to shift his hand from one control knob to another. In order to prevent disturbing the position of rate knob 8 when displacement knob 7 is turned, a detent 28 is provided acting on shaft 20. Also to prevent rotation of the displacement knob by a feed-back of the motion of the cylinder 27 through differential 13, a friction brake 29 is provided on the displacement drive which provides friction loading for the arm of the differential to which the displacement control is connected.

As above mentioned, training of the line of sight on a target in azimuth is accomplished by rotation of azimuth displacement knob 9 and rate knob 10. The rotation of knob 9 is introduced into one arm of mechanical differential 30 by way of spur gears 31 and bevel gears 32, while the output or the motion of a second arm of said differential is transmitted by gearing to shaft 33 and thence by way of bevel gears 34 to shaft 35 and by another pair of bevel gears 36 to shaft 37. Motion of shaft 37 through gearing 38 rotates prism 1 about a vertical axis. In order to prevent the azimuth motion from affecting the elevation setting, the motion of shaft 37 is transmitted by gearing to a third arm of differential 15 which functions as a compensating or "unwinding" differential. The rotation of shaft 37 also rotates prism 3 by means of gears 38' and thereby prevents the change of position of the image which would otherwise be caused by the rotation of prism 1. Azimuth rate control is obtained by an arrangement similar to the elevation rate control. The movement of azimuth rate knob 10 is transmitted by shaft 39 and rack and pinion 40 to ball carriage 41 of variable speed device 42. This device has a disc 43 driven by constant speed motor 25 by way of shaft 26 and a cylinder 44 whose motion is introduced into differential 30 by way of a third arm and appears at the output as a rotation of shaft 33, this motion being combined by the differential with the rotation of displacement knob 9. A detent 45 is provided on rate setting shaft 39 and a friction brake 46 on the displacement drive prevents interaction of the rate and displacement settings, as described in connection with the elevation rate control.

The method of determining range by means of oppositely rotated optical wedges is fully described in application No. 211,550, previously referred to, and only the present means for effecting this rotation will be here described. It is assumed that a dimension of the target, for instance, wing spread, is known. This value is set into the sight by adjusting wing spread knob 65 with reference to a suitable scale, not shown.

As described in the above-mentioned application, slant range $D_0$ is equal to the target wing spread divided by the product of the sine of the angle through which the optical wedges are displaced and a constant C.

In order to take into consideration a foreshortened view of the target where the path of the target is offset from that of the pursuit plane, the angle in azimuth the line of sight takes with reference to the longitudinal axis of the pursuit craft is introduced.

Wingspread knob 65 rotates a three-dimensional cam 64 in accordance with target dimensions. The cam is translated by means of gear and rack mechanism 67 which is controlled by gears 66 on shaft 35, the angular displacement of shaft 35 being proportional to the azimuth angle of the line of sight measured from the longitudinal axis of the aircraft. Cam 64 is laid out so that when actuated as just described its lift pin is displaced in proportion to the product of target dimension and the cosine of the angle the line of sight makes with the fore and aft line of the aircraft. The lift pin displacement thus obtained, when divided by the product of the sine of the angle through which the prisms are turned and a constant C is equal to range as explained in detail in the above-mentioned copending application. The latter operation is accomplished by means of cam 60 which is translated by lift pin 63 of cam 64. Cam 60 is rotated by long pinion 61 and gear 62 driven from shaft 51 which is displaced by a range rate mechanism described further on. The lift pin of cam 60 is used to effect the range adjustment of the optical wedges, the cam being so laid out that the movement of the lift pin is proportional to the sine of the angle through which the wedges are displaced and the required rotary movement of the cam for this displacement is equal to slant range, $D_0$. Coaxial range displacement and range rate knobs are provided which enable the operator to make range settings in the same manner in which elevation and azimuth settings are made. The motion of range displacement knob 47 by means of spur gears 48 and bevel gears 49 is introduced into mechanical differential 50 by way of one arm and a second arm of the differential is connected by gearing to shaft 51. Rotation of range rate knob 52, transmitted by way of shaft 53 and rack and pinion 54, displaces ball carriage 55 of variable speed device 56 having disc 57 driven from constant speed motor 25 by way of shaft 26 and gearing 58. Cylinder 59 of speed device 56 has imparted to it a rate of rotation proportional to the displacement of ball carriage 55 from the center of disc 57, which motion is introduced into a third arm of differential 50 and appears at the output as a rotation of shaft 51, the differential combining this motion with that of displacement knob 47.

The relationships of the quantities entering into the computation of range are shown diagrammatically in Fig. 2. It is assumed that the wing spread of the target is known by the operator of the device. In practice he will be provided with a table of wing spreads. Range may therefore be computed from the projection of this wing spread perpendicular to the line of sight and the angle ($\theta$) subtended by this projected wing spread at the sight. Since $\theta$ is usually a small angle, range ($D_0$) is taken to be equal to projected wing spread divided by $\theta$. Projected wing spread is obtained from actual target wing spread by multiplication by the cosine of the azimuth angle ($A_0$) between the flight axis and the line of sight. It is assumed that the longitudinal axis of the craft coincides with the flight axis, that is, that no side drift occurs. To simplify the figure, since $\theta$ is small, $A_0$ is shown as the angle between one side of $\theta$ and the flight axis. An approximation of negligible importance is made in showing the base angle of the small right angle triangle which includes wing spread as equal to $A_0$.

The motion of shaft 51, representing slant range of the target ($D_0$), is transmitted by bevel gears 69 to shafts 70 and 71, the former of these two shafts feeding range to azimuth prediction cam 79 and by way of the latter shaft to elevation prediction cam 72.

The means by which motions proportional to the azimuth, elevation and slant range of the target are introduced into the computer have been described. From the rates of change of these quantities and from ballistic data for the projectiles used, the deflection angles of the gun in elevation and azimuth are computed, that is, the angular offsets between the line of sight and axis of the gun bore in two perpendicular planes. Each deflection angle is considered as being made up of two parts: (1) the predicted relative angular motion of the target during the flight of the projectile from the gun to the target, and (2) the angular offset necessary to compensate for change of trajectory of the projectile due to "wind" acting upon it during its time of flight. The "wind" which deflects the projectile both in azimuth and elevation is considered to be the relative velocity of the airplane and the air and is taken as numerically equal to the indicated air speed (IAS) shown by an air speed meter.

For computing the first part of the elevation deflection angle, rod 72', which is connected to ball carriage 22 and has a displacement proportional to the rate of change of elevation angle, is caused to translate three-dimensional cam 72 and this cam is rotated in accordance with slant range ($D_0$) from shaft 71 through shaft 73 and pinion 74 meshing with a gear on the cam. The prediction component of the elevation deflection angle is equal to the rate of change of elevation angle multiplied by the time of flight (T) of the projectile, and since this time may be taken as a function of range ($D_0$), cam 72 is positioned according to $D_0$ and $E_0$ rate to obtain as the lift of the follower 75 the prediction angle, that is, $$\frac{dE_0}{dt}T$$

This displacement is introduced by means of rack and pinion 76 and shaft 77 into one arm of mechanical differential 78, a second arm of which is driven in accordance with the second part of the deflection angle, that is, the ballistic correction, determined in a manner described hereinafter.

The azimuth prediction component of the total azimuth deflection angle is obtained in a manner similar to the elevation prediction by translating three-dimensional cam 79 in accordance with rate of change of azimuth angle from push rod 80 connected to ball carriage 41. This cam is rotated in accordance with slant range ($D_0$) from shaft 70 by way of bevel gears 81 and pinion 82 which meshes with a gear on the cam. The lift of cam follower 83 is the azimuth prediction angle which is introduced into one arm of mechanical differential 84 by way of rack and pinion 85 and shaft 86, a second arm of said differential receiving the azimuth ballistic correction.

For computing the ballistic corrections in elevation and azimuth, indicated air speed (IAS) is introduced into the computer by turning air speed knob 87, geared to a dial 88, to cause an index on said dial to match a corresponding index on a dial 89 actuated by air speed indicator 90. The motion of knob 87 is introduced into air speed resolving unit 91 by way of shaft 92, bevel gears 93, one arm of mechanical differential 94 and shaft 95. This resolving unit operates on the same principle and may be similar in construction to the resolving unit described in aforementioned application Serial No. 211,550. Fig. 3 of the present application is similar to Fig. 2 of said prior application and illustrates the construction of the resolving unit.

The resolving mechanism as a whole is oriented in azimuth from gun azimuth shaft 96, whose positioning will be later disclosed, by way of bevel gears 97, shaft 98 and worm 99 meshing with teeth on the periphery of disc or gear 91' on which the mechanism is mounted. The two component velocities into which the air speed is resolved are those in the horizontal plane across and along the line of fire. Shaft 95 which is angularly displaced in accordance with the airspeed, turns shaft 176 through worm drive 175 to position rack bar 177, by means of pinion 176' engaging a rack thereon, proportionally to air speed. The plate 177' on which bar 177 is mounted is movable in guide 178' secured to the face of disc 91' and rotating therewith. Plate 177' has a hole engaged by a pin 178 on slider 179. By a connection to differential 94 the displacement of shaft 98 is combined with that of shaft 92 to remove the effect of the turning of disc 91', in azimuth, upon the position of shaft 95 and hence upon the radial position of rack bar 177. Differential 94 functions as a compensating differential. The slider 179 is mounted for transverse movement in a lateral slideway in the vertically movable T-shaped member 180 through which extends an elongated pinion 181 mounted on shaft 183 and meshing with rack teeth 182 on the rear of slider 179. Up and down movement of member 180 is transmitted to a pinion 184 meshing with rack teeth 185 on the rear thereof, the pinion being mounted on shaft 101. It will be apparent that the horizontal wind velocity introduced from shaft 176 is resolved into two components, which, due to the orientation of disc 91', are head wind and cross wind, referred to the line of fire. These components are both functions of the azimuth angle $A_g$ through which disc 91' is turned. The head wind or horizontal component of the air speed along the line of fire is obtained as a rotation of shaft 100, geared to shaft 183, while the component across the line of fire is taken from the resolving unit as a rotation of shaft 101. Shaft 100, through rack and pinion 102, translates three-dimensional cam 103 which is rotated in accordance with gun or quadrant elevation (corrected for departure from level by means to be described) from shaft 104, whose positioning will also be disclosed later. Cam 103 is so laid out that the lift of its follower 105 represents the ballistic correction at a fixed range as a function of wind velocity and elevation angle and to introduce the further factor of variable range, cam pin 105 translates a second three-dimensional cam 106 which is rotated in accordance with slant range ($D_0$) by shaft 107 driven from shaft 51 by bevel gears 108. The lift of cam follower 109, positioned by cam 106, is the elevation ballistic correction taking into account head wind, quadrant elevation and range. This lift is converted into a rotation by means of rack and pinion 110 and introduced into mechanical differential 78 by means of bevel gears 111 actuating one arm of the differential, where it is combined with the elevation prediction introduced by shaft 77 and the combined displacement positions one arm of mechanical differential 112, a second arm of which is positioned by cylinder 113 of variable speed device 114, this speed device functioning as a torque amplifier.

Torque or force amplification is desirable at this stage of the computing operation since the two components of the deflection angle (prediction and ballistic corrections) are obtained as lifts of cam followers and these followers normally can exert insufficient force to drive the succeeding elements of the computing mechanism. The action of the variable speed device 114 as a torque amplifier is as follows: Disc 115 is driven at a constant speed from motor 25 by way of shaft 26 and gears 116. The elevation prediction angle introduced into differential 78 as the displacement of shaft 77 and the elevation ballistic correction introduced into the same differential by way of bevel gears 111 are additively combined by the differential and introduced into one arm of differential 112 by gear 117. A second arm of said differential is connected to cylinder 113, while the resultant displacement of the third arm is transmitted by means of rack and pinion 118 and displaces ball carriage 119. Increasing displacement of ball carriage 119 from a central position causes cylinder 113 to be rotated at an increasing rate until the rotation of the differential shaft mounting gear 117' is at the same rate as that of the shaft mounting gear 117 by means of which the combined prediction and ballistic corrections are introduced into differential 112. The angular displacement of shaft 120, mounting gear 118' meshing with gear 117', therefore represents the total angular correction, and since the power for driving shaft 120 comes from disc 115 by way of the balls of ball carriage 119 and cylinder 113, a considerable load may be imposed upon this shaft.

Shaft 120 by way of bevel gears 121 and shaft 122 drives one arm of mechanical differential 123, a second arm of which is driven from shaft 14 by way of bevel gears 124 and shaft 125. The sum of the motions of shafts 120 and 14 appears as the rotation of shaft 126 driven from the third arm of the differential. Since the motion of shaft 14 is proportional to the present elevation angle of the target, the addition of the prediction and ballistic correction angles, i. e., the elevation deflection angle, causes the displacement of shaft 126 to be proportional to the angle at which the gun should be elevated ($E_g$).

The displacement of the shaft 126 is transmitted by way of bevel gears 127 and shaft 128 to high and low speed gun elevation ($E_g$) transmitters 129 and 130, respectively. The relative motion of these transmitters is in a ratio determined by the ratio of spur gears 131, for example 36:1. These transmitters are preferably of the self-synchronous type, that is "selsyn" transmitters, connected by transmission lines to self-synchronous receivers 129' and 130' by means of which gun elevation data is indicated at the gun 200.

For obtaining the ballistic correction in azimuth, the cross wind or wind component across the line of fire is derived from resolving mechanism 91 as the displacement of shaft 101 and three-dimensional cam 150 is rotated in accordance therewith. This cam is translated by cam follower 153 which is positioned by a second three-dimensional cam 152. Cam 152 is rotated from shaft 104 by way of pinion 103' and a gear on the cam in accordance with gun elevation ($E_g$) (corrected for departure of the sight from a level condition) and is translated in accordance with range ($D_0$) from shaft 107 by way of rack and pinion 154. The lift of follower 151 on cam 150 therefore combines functions of cross wind, elevation and range and represents azimuth ballistic correction which is fed by way of rack and pinion 156, shaft 155, bevel gears 157 and shaft 158 into differential 84, where it is combined with the azimuth prediction angle to give the total azimuth deflection.

For supplying sufficient torque to position succeeding members in accordance with total azimuth deflection angle, variable speed device 139 is connected to operate in a manner similar to variable speed device 114 and receives the combined azimuth prediction and ballistic correction angles from differential 84 by way of differential 140 and transmits this motion as a displacement of shaft 141, bevel gears 142 and shaft 143 to mechanical differential 144, where it is added to the present azimuth of the target, introduced into differential 144 from shaft 33 by way of bevel gears 145 and shaft 146. The output of differential 144 representing the sum of the present target azimuth and the azimuth deflection angle, i. e., the gun azimuth ($A_g$), is transmitted by shaft 99 to high and low speed gun azimuth transmitters 148 and 149, respectively, rotating relative to one another at the ratio of gears 147. As in the case of the elevation transmitters, these transmitters are preferably of the self-synchronous or "selsyn" type adapted to actuate self-synchronous receivers 148' and 149' at the gun or guns through suitable transmission lines.

The theory of operation of the computer in computing ballistic correction angles is based on the assumption that the axes of the optical system are truly horizontal and vertical. The effect of head wind, for example, is computed as a function of the elevation of the gun from the horizontal. If the craft is climbing or diving, its longitudinal axis is tilted relative to the horizontal and the elevation angle fed to the ballistic computing cams, which is an angle measured relative to the craft, cannot be used directly for ballistic correction computation. A correction factor must be introduced and means for introducing this factor are provided by level knob 132 geared to ball level indicator 133, having an arcuate tube 134 adapted to be rotated about a horizontal axis parallel to the craft's lateral axis by rotation of knob 132. When the ball indicator 134' is not centralized, thereby indicating that the longitudinal axis of the craft is not horizontal and therefore that the sight is not level, the rotation of knob 132 necessary to bring the ball to a central position is transmitted by way of shaft 135 and bevel gears 136 to mechanical differential 137, where it is added to the gun elevation ($E_g$) entering the differential from shaft 138 before the combined motion is transmitted to the ballistic cams by shaft 104 and thereby corrects the settings of these cams. It is assumed as before noted that the craft's longitudinal axis coincides with the flight axis, which is the axis along which relative wind acts.

The operation of the device is as follows:

If the sight is not level as shown by the position of the ball of level indicator 133, the operator first introduces a correction for this condition by rotating level knob 132 to bring the ball indicator 134' back to a central position, and by this operation sets into the ballistic correction computing mechanism a compensating displacement by way of shaft 135, bevel gears 136 and differential 137.

Upon sighting the target, it is assumed the operator will be able to identify the type of plane and from a table of values furnished him the wing spread will be found. This value of wing spread is set into the computing mechanism by rotation of knob 65. At this time a further necessary preliminary operation is the matching of the pointer on dial 88 with the pointer on dial 89 of air speed indicator 90. The operator then estimates the target azimuth and elevation angles, or a first approximation of their values may be obtained from the pilot of the craft who has before him crossed lines on the front window to aid in estimating these angles. The approximate angles are set by means of elevation displacement knob 7 and azimuth displacement knob 9, respectively. Upon looking through the sight, the target should then be in the field of view which, in a preferred form of the invention, may have an angular value of 18°.

The target will normally appear to be moving across the field of view and in order to maintain the image or images centralized, the operator will normally find it necessary to manipulate both displacement and rate knobs, which may be done in the present arrangement by "double gripping" owing to the proximity of these two knobs and their coaxial arrangement. With practice, although manipulated by one hand, the two knobs may be turned independently to a limited but sufficient extent. If a target is moving at an apparently steady rate across the field of view, the setting up of suitable elevation and azimuth rates will maintain the image centralized once it has been brought to this position by manipulation of the two displacement knobs. When the target image remains centered with respect to the cross hairs of reticle 5', the operator sets the range by operating range displacement knob 47 until the wing tips of the two target images touch, as described in aforementioned application No. 211,550.

When the range has been set, the mechanism is in a completely operative condition and correct aiming data is supplied to the gun or guns from elevation transmitters 129 and 130 and azimuth transmitters 148 and 149. When range varies, a constant rate of change of range is set by rotating knob 52 and by "double gripping" the two range knobs 47 and 52, the operator will be able to keep the two images of the optical range finder in their predetermined relative positions indicative of a correct range setting.

Any error in the azimuth and elevation angles transmitted to the gun or guns is directly reflected in firing errors, whereas an error in range introduces only a secondary error in the ballistic and prediction corrections.

By suitable adjustment of the elevation, azimuth and range finder controls, the apparatus of the present invention may be used to obtain a measure of ground speed and also to establish certain of the angular relationships necessary for aerial bombing. Thus, to use the apparatus as a ground speed measuring device the line of sight is directed vertically downward by rotating prism 1 about its horizontal axis, and a suitable azimuth angle is set in by rotating the prism about its vertical axis. Images of terrestrial objects may then be caused to remain stationary in the field of view by setting in the proper elevation rate, from which ground speed may be calculated when altitude is known.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. Apparatus for compensating for the effect of wind on a shell fired from an airplane mounted gun comprising sighting and computing means for determining a line of fire to a target which consists of gun elevation and gun azimuth angles, means positioned according to indicated air speed, resolving means actuated thereby and according to the indicated gun azimuth angle for obtaining a measure of component airspeed in a direction perpendicular to the vertical plane of the gun axis, means providing a measure of target range, a mechanism actuated in acordance with the elevation angle of the gun in said plane and said measures of component wind and range for computing a windage correction to the azimuth aiming angle of the gun, means for regulating the windage correction in proportion to deviation of the airplane from a level course, and means automatically correcting the azimuth angle for the gun relative to the line of sight in accordance with said regulated windage correction.

2. In apparatus for applying a windage correction to the indicated elevation aiming angle of a line of fire of an airplane mounted gun during substantially level flight of the plane, means positioned in accordance with the indicated azimuth aiming angle of the gun relative to a normally horizontal axis of the plane, means positioned in accordance with a measure of the airspeed of the plane as representing relative wind velocity effective in deflecting a projectile fired from the gun, means receiving azimuth angle and wind velocity from the first two means and supplying a measure of the horizontal component of wind velocity along the line of fire, means positioned in accordance with the indicated gun elevation angle, means providing a measure of target range, means receiving said horizontal component of wind velocity, gun elevation angle and target range from said several means to effect automatically an offset of the indicated and gun angle in elevation, which compensates for the joint effect of said last three received quantities, and means for varying the gun elevation angle received by the last-mentioned means in proportion to inclination of the longitudinal axis of the airplane to correct said offset when the airplane is not on a truly horizontal course.

3. An apparatus according to claim 1 in which said mechanism is actuated by means comprising a differential having a plurality of input arms, one of which is displaced in proportion to the indicated gun elevation angle, and another in proportion to the inclination of the longitudinal axis of the airplane.

4. In apparatus for applying a windage correction to the indicated azimuth aiming angle of a line of fire of an airplane mounted gun during substantially level flight of the plane, means positioned in accordance with the indicated azimuth angle of the gun relative to a normally horizontal axis of the plane, means moved in accordance with the airspeed of the plane as representing relative wind velocity effective in deflecting a projectile fired from the gun, means receiving said azimuth angle and wind velocity from said first two means and supplying as a function of said two quantities a measure of the horizontal component of wind velocity across the line of fire, means positioned in accordance with indicated gun elevation angle, means providing a measure of target range, a mechanism receiving said wind component, gun elevation and target range from said several means and actuating wind correcting apparatus for altering the azimuth aiming angle of the gun in accordance with a function of said three received quantities, means for indicating the inclination of the longitudinal axis of the airplane on departure from level flight, and means adjustable according to the inclination indicating means for proportionately varying the gun elevation angle received by said mechanism whereby a corresponding correction in the azimuth aiming angle is effected.

5. In an inter-plane fire control device for an airplane mounted gun, a sight having members determining a line of sight, means controllable at the sight for simultaneously indicating the angles for guidance in positioning the gun in azimuth and elevation defining a line of fire and for positioning the line of sight in azimuth and elevation, means moved in accordance with a measure of airspeed of the firing craft, a computing mechanism having means controlled in accordance with indicated gun azimuth and elevation angles and range and the means for setting wind in accordance with the measured airspeed, said mechanism further including means for deriving from said azimuth and wind settings a head wind component along the line of fire and for computing a wind correction angle in indicated gun elevation as a function of said head wind, range, and said elevation angle, together with means automatically relatively offsetting the indicated gun elevation position angle and line of sight in accordance with said computed correction angle, and means for regulating the magnitude of the elevation angle in proportion to the inclination of the longitudinal axis of the firing airplane.

6. In an apparatus for directing fire from a gun mounted on an aircraft and aimed at a target thereby defining a line of fire, a computing mechanism comprising a first three-dimensional cam, means for positioning said cam in one dimension controlled in part in accordance with indicated gun elevation ($E_g$), means for continuously positioning the cam in another dimension in accordance with slant range ($D_0$), the last-mentioned means including a variable speed device and a control therefor for obtaining an adjustable constant rate of change of range, a follower for said cam, the cam being so laid out that the lift of the follower is proportional to a ballistic function of elevation and range, a resolving unit having an output member, means for adjusting the unit in one sense according to a measure of wind velocity relative to the craft, other means for adjusting the unit in a different sense in accordance with indicated gun position in azimuth whereby the output member is displaced in proportion to the horizontal component of wind velocity across the line of fire of the gun, a second three-dimensional cam disposed so as to be displaceable in one dimension by the follower of the first cam, and in another dimension by the output member of the resolving unit, a follower for the second cam, said cam being so laid out that its follower is adjusted continuously in proportion to the azimuth correction for the wind component across the line of fire, and gun angle transmitting means operatively connected with the last-mentioned follower.

CARL G. HOLSCHUH.
DAVID FRAM.